(12) United States Patent
Jenne et al.

(10) Patent No.: US 8,839,013 B2
(45) Date of Patent: Sep. 16, 2014

(54) METHOD OF REDUCING POWER CONSUMPTION IN A NETWORK

(75) Inventors: Nathan Stanley Jenne, Lincoln, CA (US); Andrew T Bare, Sunnyvale, CA (US); Shaun Wakumoto, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 13/249,992

(22) Filed: Sep. 30, 2011

(65) Prior Publication Data

US 2013/0086403 A1    Apr. 4, 2013

(51) Int. Cl.
G06F 1/00 (2006.01)
G06F 1/32 (2006.01)
G06F 15/173 (2006.01)
H04L 12/28 (2006.01)

(52) U.S. Cl.
CPC ............. *G06F 1/3278* (2013.01); *Y02B 60/126* (2013.01)
USPC ........... 713/322; 713/320; 709/223; 709/224; 370/254

(58) Field of Classification Search
USPC .......... 713/300, 320, 323, 324; 709/223–224, 709/226; 370/254–256
See application file for complete search history.

(56) References Cited

U.S. PATENT DOCUMENTS

| | | | |
|---|---|---|---|
| 5,440,538 A | 8/1995 | Olsen | |
| 7,616,587 B1 | 11/2009 | Lo et al. | |
| 7,760,668 B1 * | 7/2010 | Zinjuvadia | 370/256 |
| 2003/0037162 A1 * | 2/2003 | Kotser | 709/236 |
| 2005/0080903 A1 * | 4/2005 | Valenci | 709/227 |
| 2007/0076747 A1 * | 4/2007 | Zinaty | 370/463 |
| 2007/0140147 A1 * | 6/2007 | Touve et al. | 370/255 |
| 2007/0242602 A1 | 10/2007 | Pang et al. | |
| 2007/0280239 A1 * | 12/2007 | Lund | 370/392 |
| 2009/0028180 A1 * | 1/2009 | Strater et al. | 370/465 |
| 2009/0073989 A1 | 3/2009 | Cai et al. | |
| 2009/0204836 A1 | 8/2009 | Diab et al. | |
| 2009/0219836 A1 * | 9/2009 | Khan et al. | 370/256 |
| 2010/0040070 A1 | 2/2010 | Suh et al. | |
| 2010/0218028 A1 * | 8/2010 | Yu et al. | 713/340 |
| 2011/0022725 A1 * | 1/2011 | Farkas | 709/238 |
| 2011/0134803 A1 * | 6/2011 | Dalvi et al. | 370/256 |

* cited by examiner

Primary Examiner — Thomas J Cleary (57) ABSTRACT

A method of reducing power consumption in a network. A first network device powers down or reduces the port speed of a port if said port is blocked by a loop mitigation protocol.

17 Claims, 6 Drawing Sheets

METHOD OF REDUCING POWER CONSUMPTION IN A NETWORK

BACKGROUND OF THE INVENTION

Various loop mitigation protocols exist for preventing formation of loops in a network. Examples include, but are not limited to, Spanning Tree Protocol (STP) and its variants (RSTP, PVST, MSTP, R-PVST etc).

Typically, a loop mitigation protocol identifies redundant links in the network and devices running the loop mitigation protocol communicate with one another and negotiate which redundant links will be blocked.

BRIEF DESCRIPTION OF THE DRAWINGS

Some examples are described in the following figures:

FIG. 4 (*a*) is a flow chart showing another example of a method for reducing power consumption in a network;

FIG. 4 (*b*) shows the flow of messages between two network devices in the method of FIG. 4 (*a*);

FIG. 5 (*a*) is a flow chart showing another example of a method for reducing power consumption in a network;

FIG. 5 (*b*) is a flowchart showing transmission of loop mitigation protocol messages when a port of a network device is powered down;

FIG. 5 (*c*) is a flow chart showing an example of a method for disabling a link.

DETAILED DESCRIPTION

Figure 1:
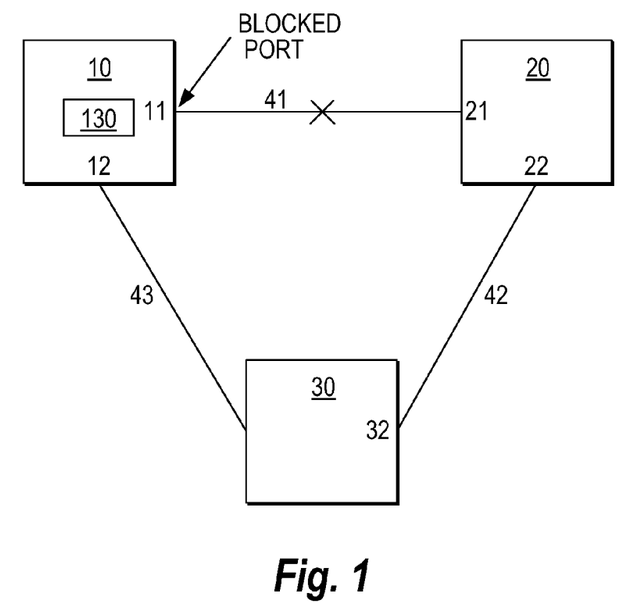
FIG. 1 is one example of network having a network device according to the present disclosure.

FIG. 1 shows an example of a network which uses a loop mitigation protocol, such as STP or one of its variants. A first network device 10 is connected to a second network device 20 by a first link 41. Second network device 20 is connected to third network device 30 by a second link 42; and third network device 30 is connected to first network device 10 by a third link 43.

In the context of this application, a 'network device' is any device with network functionality which may be connected to a wired network, e.g. a switch, router etc. A link between two network devices connects to respective ports of said network devices; e.g. in FIG. 1, link 41 connects to a first port 11 of the first network device and a port 21 of the second network device at the other end.

When a link is set up between two network devices (e.g. by connecting a cable between ports of the two devices), the network devices typically negotiate a speed for the link. For example the ports may exchange information about their respective capabilities and determine the highest speed at which both ports are capable of operating. For instance, if first port 11 of the first network device 10 is capable of operating at 10 Mbps, 100 Mbps, 1 Gbps or 10 Gbps and port 21 of the second network device 20 is capable of operating at 1 Gbps or 10 Gbps then the devices may agree to a link speed of 10 Gbps, in which case both ports will operate at 10 Gbps.

Spanning Tree Protocol (STP) is one example of a loop mitigation protocol that eliminates 'loops' (redundant paths) from a network. It first elects a root device, which in the example of FIG. 1 is network device 30. The network devices participating in the STP protocol detect and block redundant links which might otherwise cause a network loop. In the example shown in FIG. 1, port 11 of the first network device 10 is blocked.

When a port is blocked by a loop mitigation protocol, such as STP, it is effectively not used and any links connecting to that port are in effect blocked. Thus in FIG. 1, the link 41 is effectively rendered inactive. However, the blocked port and link may be used as a backup link if the primary, active path fails.

The present disclosure proposes reducing the power consumption of a network device by switching off, or reducing the power of, a port that has been blocked by a loop mitigation protocol.

As shown in FIG. 1, the first network device 10 has a power saving module 130 which determines if any of its ports are blocked by a loop mitigation protocol and reduces the power consumption of any blocked ports by reducing the port speed or by switching the port off. The other devices in the network may also have power saving modules although that is not necessary in all implementations.

Figure 2:
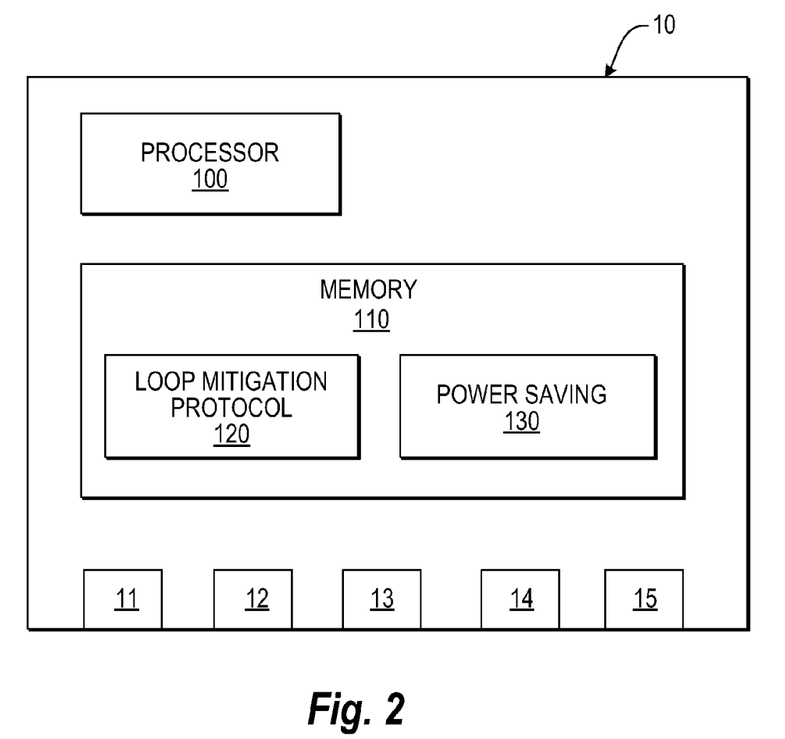
FIG. 2 is a schematic diagram showing one example of a network device according to the present invention in more detail.

FIG. 2 is a schematic diagram showing one possible structure for the first network device 10 in detail. The network device has a processor 100, a memory 110 and a plurality of ports 11, 12, 13, 14, 15. This by way of example only and the network device may have more or fewer ports and may have additional components.

The memory 110 stores machine readable instructions which are executable by the processor 100. The machine readable instructions comprise instructions for implementing a loop mitigation protocol (loop mitigation protocol module 120 in FIG. 2). The machine readable instructions further comprise instructions for saving power (power saving module 130 in FIG. 2). In addition, while not shown in FIG. 2, there may be further modules of machine readable instructions stored in the memory, such as software routines for routing data packets and/or instructions for implementing other protocols.

Figure 3:
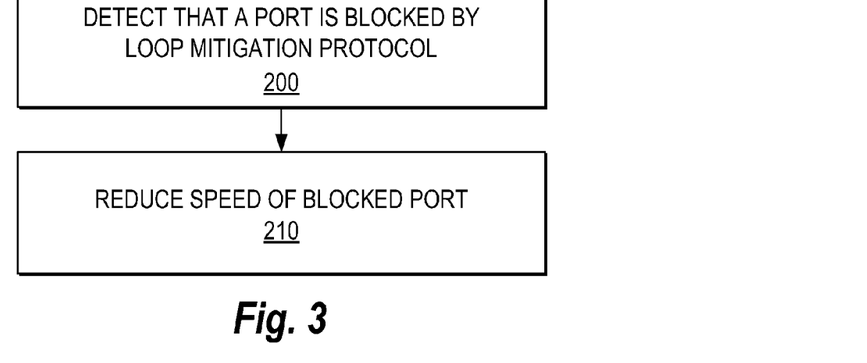
FIG. 3 is a flow chart showing one example of a method for reducing power consumption in a network.

FIG. 3 is a flow diagram showing one possible method of reducing power consumption. At 200 a network device detects that one of its ports has been blocked by a loop mitigation protocol. Then at 210 the speed of that port is reduced. A port typically consumes less power when operating at a lower speed and therefore power is saved.

At 200, the network device 10 may detect that the port has been blocked by being notified by the loop mitigation protocol module 120. For example the loop mitigation protocol module could automatically activate the power saving module. Alternatively the power saving module may monitor the network device's ports, or an area of memory listing blocked ports, in order to detect when a port has been blocked.

At 210, the speed of the port may be reduced to any appropriate speed. For example, if the first port 10 of the first device is capable of operating at 10 Mbps, 100 Mbps, 1 Gbps or 10 Gbps, and is connected to a port on another device capable of operating at 100 Mbps, 1 Gbps or 10 Gbps, then when the link is originally set up the ports will carry out auto-negotiation and in most cases settle on 10 Gbps for the link (i.e. the highest rate supported by both ports). If the first port is then blocked by a loop mitigation protocol, then the power saving module may reduce the speed of the first port to 10 Gbps or 1 Gbps. In one example the power saving module reduces a port to its lowest supported operating speed, or the lowest operating speed supported by both ports at either end of the link, when said port is blocked by a loop mitigation protocol.

When the speed of the first port is reduced, this will cause re-negotiation of the link with the port on the other side of the link. The re-negotiation typically involves turning off the link and then re-initiating the link at the lower speed (this process is known as 'link toggling'). As the network topology has been changed (by changing the speed of one of the links), this may also cause the loop mitigation protocol to re-calculate based on the new network topology. However, as the speed of the blocked link has been reduced this will cause the blocked link to have even lower priority in the loop mitigation protocol and so it will remain in the blocked state.

Figure 4A:
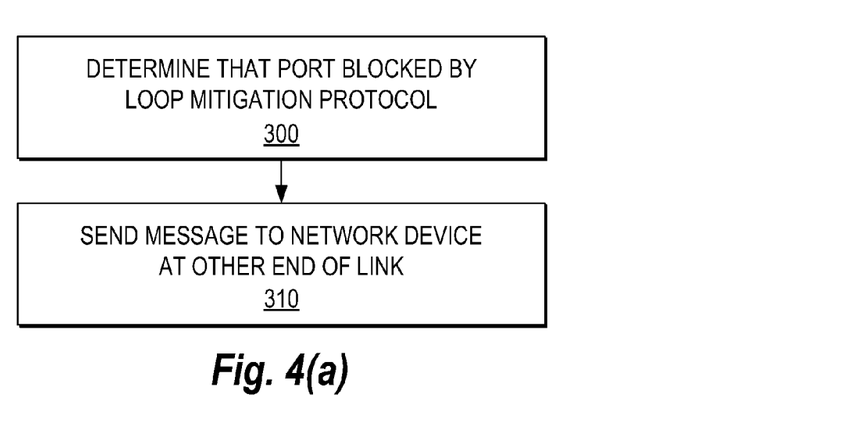

The method of FIG. 3 is 'unilateral' in that it may be carried out by any network device having a power saving module and does not require a network device at the other end of a link to support this method of power reduction. FIG. 4 (a) is a flow diagram showing a variant in which a network device having a blocked port attempts to communicate about the speed reduction with the network device at the other end of the link.

At 300 a first network device determines that one of its ports is blocked by a loop mitigation protocol. This is the same as block 200 in FIG. 3. The blocked port is connected by a link to a port of another network device.

At 310 the first network device sends a message to the network device at the opposite end of the link (e.g. the second network device in FIG. 2). The message informs the second network device that the port will have its speed reduced, but requests the second network device to continue advertising the link has having its original speed.

Figure 4B:
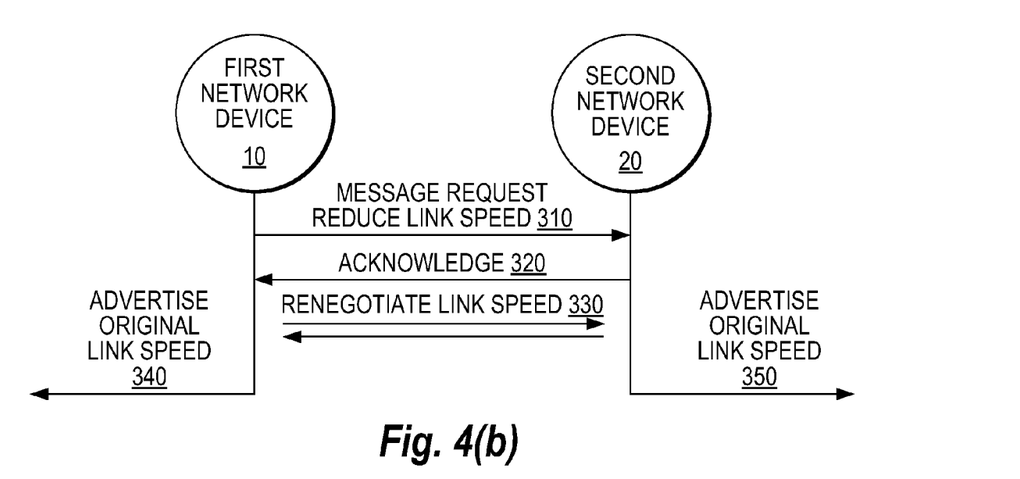

FIG. 4 (b) shows the flow of messages between the first and second network devices. Thus at 310 the first network device sends the 'speed reduction' message to the second network device. The second network device receives this message; and if it has compatible power saving scheme, then it will understand the message and send an acknowledgement to the first device at 320.

After the first device receives the acknowledgement from the second device it reduces the power of the blocked port at 330 and this leads to renegotiation of the link between the blocked port of the first network device and the port of the second network device. However, the 'link toggling' (turning off of the link and then turning it on again at the lower speed) is not advertised to the rest of the network and only the first and second network devices are aware of it. As far as other network devices are concerned the link continues to operate at the original speed and is not toggled. The fact that the 'link toggling' is not advertised is advantageous because generally loop mitigation protocols (such as STP) will notify other network devices whenever a link fails, so as to enable the protocol to respond quickly to broken paths and recalculate the paths and redundant links where necessary. However, such re-calculation takes time and is advantageously avoided in this example.

At 340 and 350 the first and second network devices advertise the link as having the original speed. The advertisement may be in loop mitigation protocol messages (e.g. BPDU messages) sent to other devices in the network. Typically a network device running a loop mitigation protocol sends such messages periodically so that other devices in the network can monitor for and become aware of any changes in network topology.

The above method has the advantage that as the original link speed is advertised, recalculation of the loop mitigation protocol (e.g. recalculation of the spanning tree) may be avoided, because as far as other devices on the network are concerned there has been no change.

If the second network device does not have a power saving scheme then it will likely ignore the 'power saving' message sent from the first device at 310 and will not send an acknowledgement message. In that case the method proceeds as in FIG. 3.

In the above two examples power was saved by reducing the speed of the blocked port to a lower speed than its original speed. In a variant on this, the speed of a blocked port may be reduced to zero (i.e. the port may be powered down or switched off). In the context of this patent application, 'reducing the speed of a port', includes not only reducing the operating speed to a slower speed, but also powering down or switching off the port. However, in some implementations powering down or switching off the port may involve further special considerations which are now described.

Figure 5A:
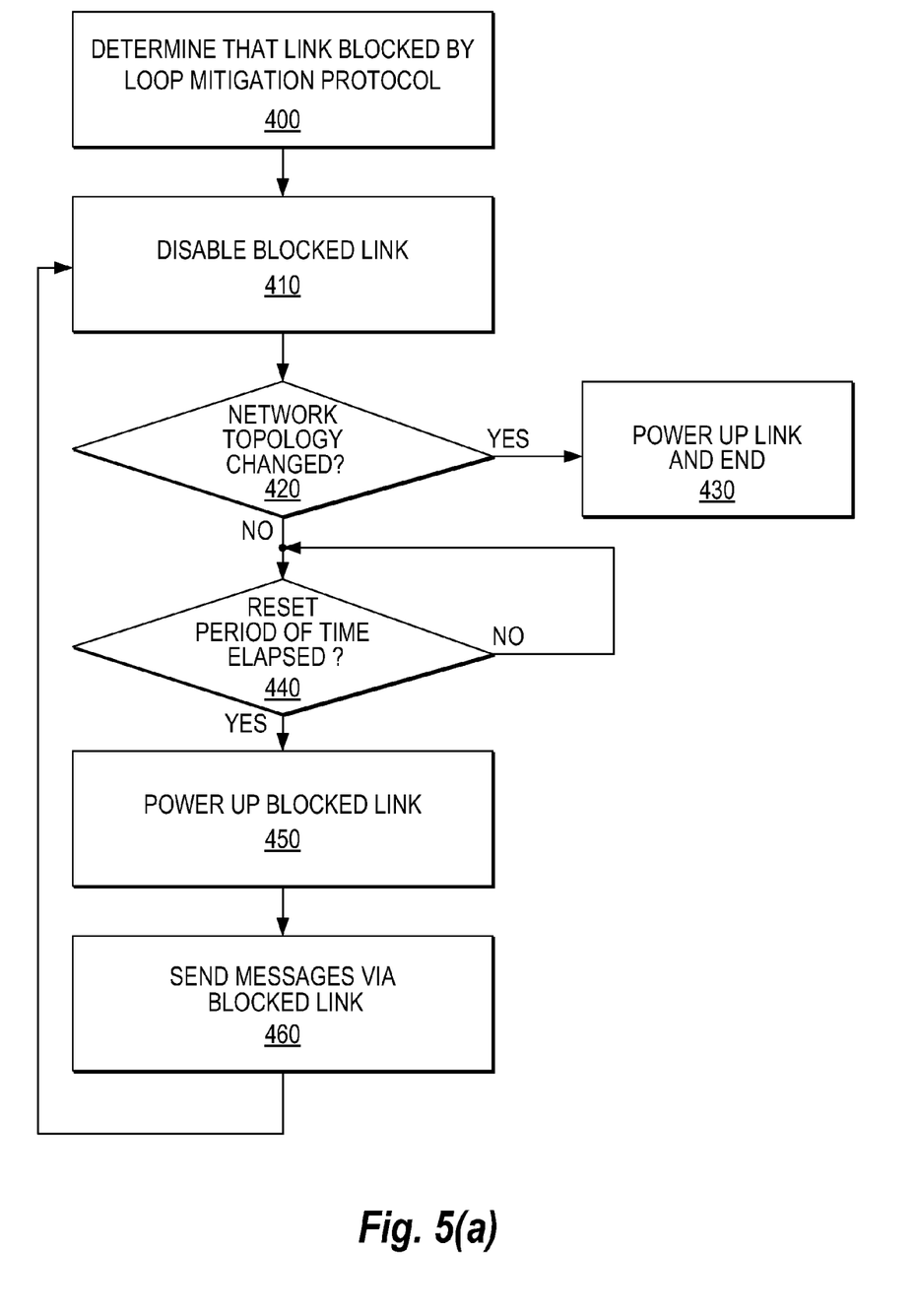

FIG. 5 (a) is a flow diagram showing a methods in which a link between two network devices is disabled. The disabled link may be powered up again periodically in order to check that the link is still capable of being re-activated and/or to pass loop mitigation protocol messages across the link.

At 400 the network device determines if any of its links to other network devices are blocked by a loop mitigation protocol. For example, if one of the network device's ports is blocked by a loop mitigation protocol then the link connected to that port will be blocked as well.

If it is determined that a link is blocked, then at 410 the blocked link is disabled. The blocked link may be disabled by powering down one of the ports to which it is connected. The port which is powered down may be predetermined, e.g. it may always be the blocked port or always the port at the other of the link. Alternatively the network devices may negotiate to decide which port is powered down or both ports may be powered down. The powering down of the link may be conducted as shown in FIG. 5 (c). At 550 the first network device, which determined that the link was blocked, sends a message to the second network device at the opposite end of the link (even though data traffic is blocked, loop mitigation protocol and other control messages are typically still able to pass while the link is enabled). The message informs the second network device that the link is to be disabled (for power saving purposes).

At 560 the first and second network devices negotiate which of them should disable the link. For example if the link is between a first port of a first network device and a second port of a second network device, then the link may be disabled by powering down either the first port or the second port (or both the first and second ports). The device which is to power down its port may for instance be chosen based on the MAC address of the device; e.g. the device with the lowest MAC address could be chosen to power down its port. In another example the network devices could exchange messages to build an explicit agreement as to which port should be powered down.

If it is decided at 560 that the first network device is to disable the link, then at 570 the first network device powers down the port at its end of the link. On the other hand if the second network device is to disable the link then at 580 the second network device powers down the port at its end of the link.

In the same way as illustrated in FIGS. 4 (a) and 4 (b) the network devices at either end of the disabled link may continue to advertise the link as operating at the original speed While the blocked port and associated link are disabled, other ports of the network device will still be operational. If the network device detects a change in network topology (e.g. from a message received at another port) at 420, then it powers up the blocked port at 430 and the link is made operational again. In that way the first and second network devices are able to communicate directly with each other and unblock the link if necessary (e.g. if the loop mitigation protocol unblocks the port).

Even if no change in network topology is detected, after a certain period of time has elapsed (440), the port is powered up again temporarily (450). After powering up the port, the first network device may send or receive control messages over the link (460). E.g. the first network device may send a message over the link to the second port to check that the link still works. The second network device may, on receiving this message at its port on the opposite end of the link, send back an acknowledgement message to verify that the link is working. The first network device may then send a further message to the second device to inform the second device that the link is valid, and the second network device may send back an acknowledgement message. If necessary any loop mitigation protocol messages may be sent to the second network device during the period of time when the port is temporarily powered up (many loop mitigation protocols require periodic exchange of messages, such as BPDU packets between devices in the network). After exchange of messages has been completed, or after a predefined period of time the first network device may power down the port again (410) and blocks 440 to 460 may be repeated etc.

If at any time the network device detects a change in network topology then the blocked port is powered up and remains so until the network topology has stabilized. After the network topology has stabilized and the loop mitigation protocol re-calculated, if the port is still blocked, then the port may be powered down again.

In a variant on the above method, the periodic power up and power down (440 and 450) may be eliminated. Instead when it is determined that the port is blocked it may be powered down until a change in network topology is detected (at which point it is powered up again).

When a blocked port is powered down it is not possible to send loop mitigation protocol messages to the port at the other end of the link. However in many loop mitigation protocols the network devices periodically send loop mitigation protocol messages (e.g. BPDU messages) to each other. The loop mitigation protocol messages may report the status of the network device and the status of its links to other network devices.

Figure 5B:
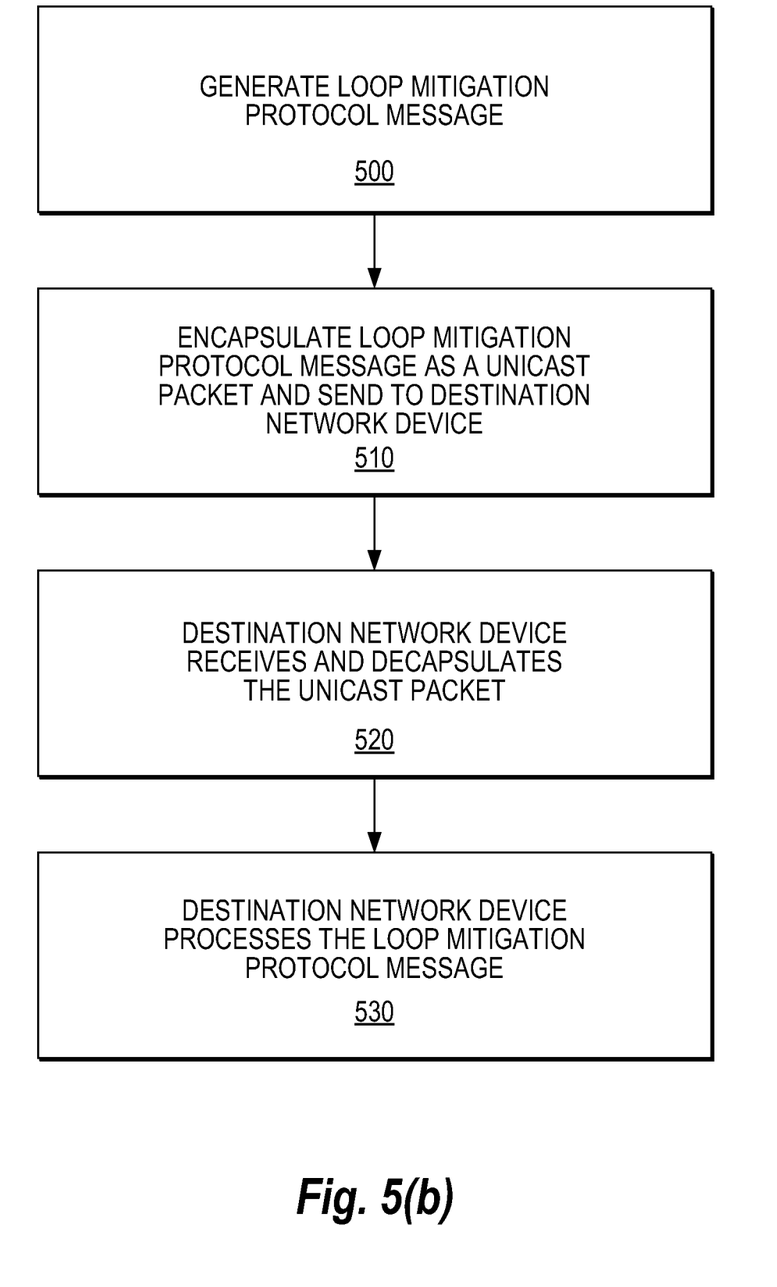
Figure 5C:
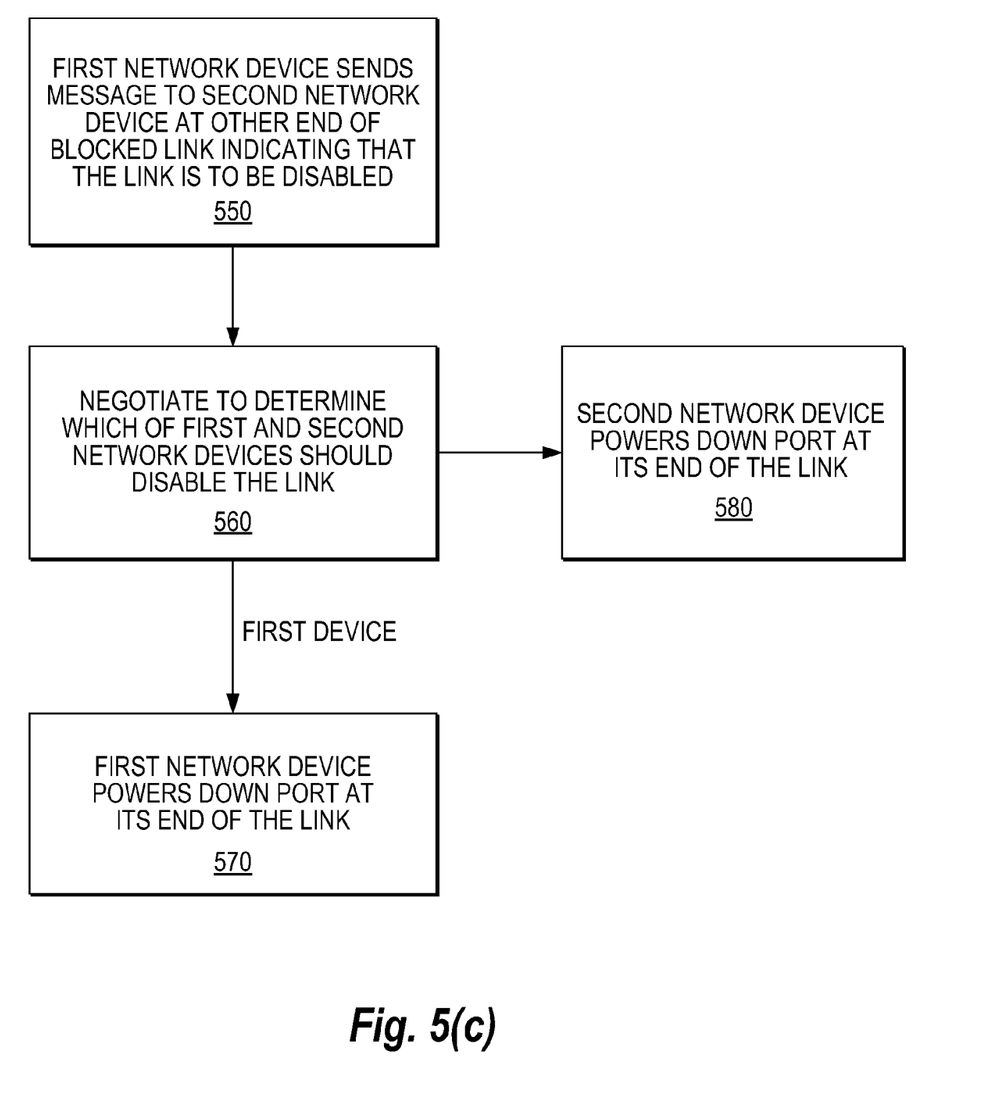

FIG. 5 (*b*) is a flow diagram showing a method of transmitting loop mitigation protocol messages from a blocked port of a network device to a network device at the other end of the blocked link.

At 500 the network device generates a loop mitigation protocol message that in normal use (if the port was not powered down) would be sent directly over a link to a port of the other network device. E.g. in normal operation a loop mitigation protocol message could be sent over link 41 from port 11 of the first network device 10 to port 21 of second network device 20 in FIG. 1. However, as the port 11 is powered down, link 41 is inactive. Therefore the message is sent indirectly, e.g. by tunneling.

At 510 the loop mitigation protocol message is encapsulated into another packet and sent as a unicast packet addressed to the second network device 20. The link joining the two network devices is blocked so the message travels via an indirect route. For instance, in the example of FIG. 1, the loop mitigation protocol message may be sent via port 11 of first network device, over link 43 to port 31 of network device 30 and finally via port 32 of network device 30 over link 42 to port 22 of network device 20.

When received by network device 20 the unicast message is decapsulated (530) to extract the loop mitigation protocol message.

The loop mitigation protocol message is then processed (540) by the network device 20 and treated as if it had been sent directly over the link 41 from port 11 to port 21 of the second network device 20.

The above method is especially useful when the blocked port is powered down until a change in network topology is detected. However, it could also be used to transmit messages in the down period of a link, when a port is powered down and powered up only periodically.

Some loop mitigation protocols (e.g. MSTP) may be optimized for use in a network having a plurality of VLANs. In this patent application such protocols are referred to as "multi-instance loop mitigation protocols". Typically such protocols handle multiple VLANs by calculating a different 'spanning tree', or instance, for each VLAN and blocking a port on some VLANs, but not others, in order to maximize performance for each VLAN.

The above described power saving methods may be modified to deal with multiple instances, by dividing the network into regions. Each region comprising only network devices (e.g. switches) which have the same set of VLANs.

The links which connect different regions are allowed to connect to each other in the normal way and so a port on such a link may have its speed reduced or even be powered down if the port is blocked. However, links between devices within a particular region should not be powered down or have their speed reduced, as they may be blocked in some VLAN instances, but not others.

Figure 6:
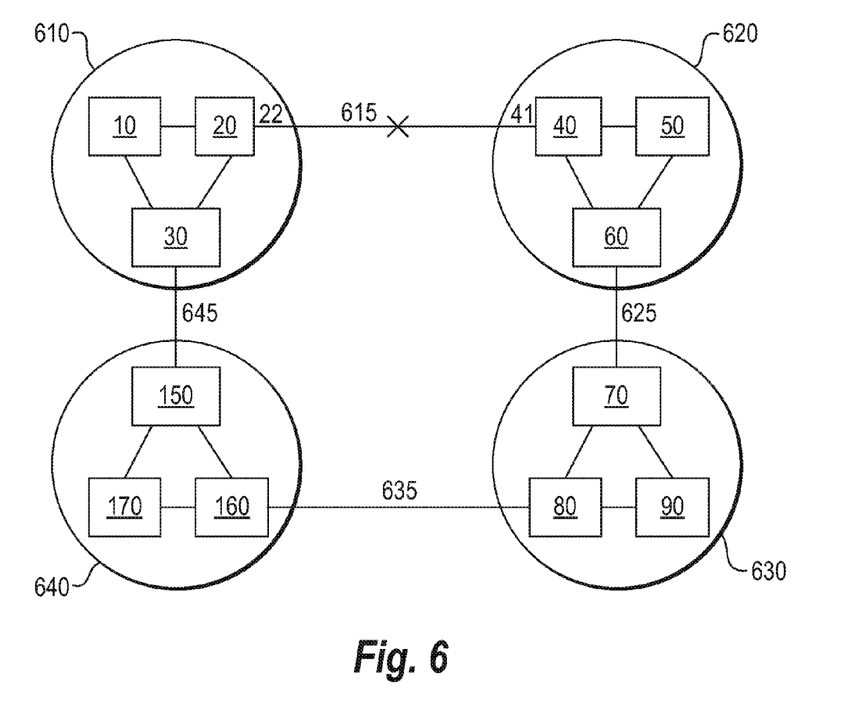
FIG. 6 shows a network having multiple regions.

FIG. 6 shows an example network having a plurality of multi-instance loop mitigation protocol (e.g. MSTP) regions. There is a first region 610, a second region 620, a third region 630 and a fourth region 640. Each region has three network devices, each of which is connected by a link to at least one other network device in the region. Of course the illustration is by way of example only and there could be more or fewer regions and each region could have more or fewer network devices than shown and each region could have a different number of network devices to other regions. The network devices are denoted by reference numerals 10, 20, 30, 40, 50, 60, 70, 80, 90, 150, 160 and 170. One of the regions may be selected by the multi-instance loop mitigation protocol as a 'root region'—for instance in the example of FIG. 6 the fourth region 640 is selected as the 'root region'.

Links between network devices in the same region are known as 'intra-region' links. Links between network devices (e.g. switches) in different regions are known as 'inter-region' links. In the example of FIG. 6, the following are inter-region links: link 615 between port 22 of network device 20 of first region 610 and port 41 of network device 40 of second region 620; link 625, link 635 and link 645. In the example of FIG. 6, port 22 of switch 20 is blocked in all VLANS in which it exists by the multi instance loop mitigation protocol and thus the link 615 is also blocked. As the link is an inter-region link, rather than an intra-region link, the port 22 can safely be reduced in speed or powered down.

Figure 7:
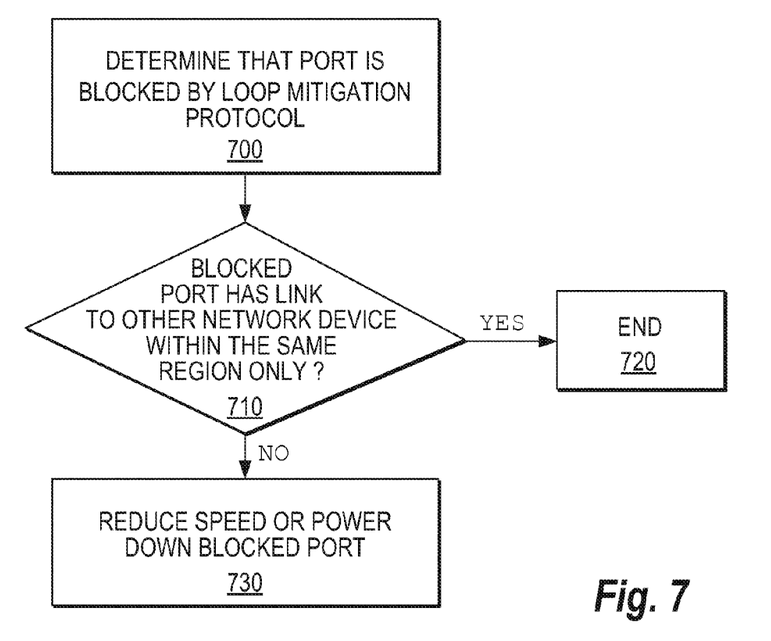
FIG. 7 is a flow chart showing an example of a method for reducing power consumption in a network device employing a multi instance loop mitigation protocol.

FIG. 7 is a flow diagram of an example method of reducing power for use in a network using a multi instance loop mitigation protocol. At 700 a network device determines if one of its ports is blocked by the loop mitigation protocol. At 710 the network device determines if the port is connected to an inter-region link or is connected to another device in the same region. If it is connected to another device in the same region then the method ends at 720 without reducing the speed of the port. However, if the port is connected to an inter-region link and does not have a link to another network device within the same region, then the method proceeds to 730 where the port is reduced in speed or powered down in the same way as in any of the other power reduction methods described above.

Various methods have been described above as sets of instructions or functions and illustrated with flow charts. The functional and software instructions described above are typically embodied as a set of executable instructions which are effected on a device which is programmed with and controlled by said executable instructions. Such instructions are loaded for execution on a processor (such as one or more CPUs, ASICs, etc). The term "processor" includes microprocessors, microcontrollers, processor modules or subsystems (including one or more microprocessors or microcontrollers), or other control or computing devices. A "processor" can refer to a single component or to plural components.

The instructions and methods illustrated herein may be stored as machine readable instructions on a memory which is readable by the processor, or hardwired into the processor itself. The term memory includes different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one machine-readable or machine-usable storage medium, or alternatively, can be provided on multiple machine-readable or machine-usable storage media distributed in a large system having possibly plural nodes. Such machine-readable or machine-usable storage medium or media is (are) considered to be part of an article (or article of manufacture). An article or article of manufacture can refer to any manufactured single component or multiple components.

What is claimed is:

1. A method of reducing power consumption of a first network device in a network, wherein the first network device includes a first port communicatively connected to a second network device via a link, the method comprising:
   determining, by the first network device, that the first port of the first network device is blocked by a loop mitigation protocol;
   in response to determining that the first port is blocked, sending a message from the first network device to the second network device to inform the second network device that a speed of the link will be reduced from an original speed to a reduced speed;
   receiving an acknowledgement from the second network device;
   in response to receiving the acknowledgment from the second network device, reducing by the first network device a speed of the first port to reduce the speed of the link from the original speed to the reduced speed; and
   advertising, by the first network device, the link as having the original speed in a message sent to a third network device.

2. The method of claim 1, wherein the message sent from the first network device to the second network device to inform the second network device that the speed of the link will be reduced is further to request the second network device to advertise the link as having the original speed.

3. The method of claim 1, wherein reducing the speed of the first port comprises reducing the speed of the first port to zero to disable the link between said first port of said first network device and a port of the second network device.

4. The method of claim 1, further comprising:
   negotiating, by the first network device, with the second network device, which of the first and second network devices will power down a port connected to the link.

5. The method of claim 4, wherein the powered down port is periodically powered up.

6. The method of claim 1, further comprising:
   sending, by the first network device, loop mitigation protocol messages to the second network device by encapsulating the loop mitigation protocol messages and sending them indirectly to the second network device via a path which does not include the blocked port.

7. The method of claim 1, further comprising:
   switching, by the first network device, the first port back to the original speed in response to the first network device detecting a change in network topology or a change in a status of the first port under the loop mitigation protocol.

8. The method of claim 1, wherein the first network device operates in one of a plurality of loop mitigation protocol regions, and wherein the method further comprises reducing, by the first network device, the speed of the first port blocked by the loop mitigation protocol in response to the first port being linked to a network device in another loop mitigation protocol region of the network and in response to the first port having no direct links to other network devices in the another loop mitigation protocol region of the network.

9. A first network device comprising:
   a first port communicatively connected to a second network device via a link;
   a processor; and
   a memory, the memory storing machine readable instructions which are executable by the processor to:
      determine that the first port has been blocked by a loop mitigation protocol,
      in response to the determination that the first port has been blocked by the loop mitigation protocol, send a message to the second network device to inform the second network device that a speed of the link will be reduced from an original speed to a reduced speed and request the second network device to advertise to other network devices that the link has the original speed,
      receive an acknowledgement from the second network device, and
      in response to receipt of the acknowledgement from the second network device, reduce a speed of the first port to reduce the speed of the link from the original speed to the reduced speed.

10. The first network device of claim 9, wherein the machine readable instructions comprise instructions to negotiate a reduced link speed for the link between the first port of the first network device and a port of the second network device, the reduced link speed being lower than the original speed; and to send a message to a third network device indicating that the speed of the link between said first and second network devices is the original speed.

11. The first network device of claim 9, wherein the machine readable instructions comprise instructions to operate the first port at the original speed in response to a detected change in network topology or a detected change in a status of the first port under the loop mitigation protocol.

12. The first network device of claim 9, wherein the machine readable instructions comprise instructions to implement a multi-instance loop mitigation protocol, wherein said instructions to reduce the speed of the first port are implemented only if the first port has a link to a network device in another region of the network and if the first port has no direct links to other network devices in the another region of the network.

13. A first network device comprising:
- a first port communicatively connected to a second network device via a link;
- a processor; and
- a memory, the memory storing machine readable instructions which are executable by the processor to:
  - determine that the link is blocked by a loop mitigation protocol,
  - in response to the determination that the link is blocked by the loop mitigation protocol, send a message to the second network device to inform the second network device that the link will be disabled,
  - receive an acknowledgement from the second network device, and
  - in response to receipt of the acknowledgement from the second network device, disable the link between the first network device and the second network device, wherein the first port is switched off,
- wherein the machine readable instructions comprise instructions to implement a multi-instance loop mitigation protocol, wherein the machine readable instructions to switch off the first port are implemented only if the first port has a link to a network device in another region of the network and if the first port has no direct links to other network devices in a same region of the network as the first network device.

14. The first network device of claim 13, wherein the machine readable instructions comprise instructions to negotiate with the second network device which of the first and second network devices will power down a port connected to the link.

15. The first network device of claim 13, wherein the machine readable instructions comprise instructions to periodically power up the link in order to send a control message before switching the first port off again.

16. The first network device of claim 13, wherein the machine readable instructions comprise instructions to send loop mitigation protocol messages to the second network device by encapsulating the loop mitigation protocol messages and sending them indirectly to the second network device via a path which does not include the first port.

17. The first network device of claim 13, wherein the machine readable instructions comprise instructions to switch on said first port in response to detecting a change in network topology.

* * * * *